United States Patent [19]
Borgford

[11] Patent Number: 5,277,091
[45] Date of Patent: Jan. 11, 1994

[54] BALE CUTTING DEVICE

[76] Inventor: Benjamin J. Borgford, P.O. Box 459, Arborg, Manitoba, Canada, R0C 0A0

[21] Appl. No.: 904,149

[22] Filed: Jun. 25, 1992

[51] Int. Cl.⁵ ............................................ A01F 29/00
[52] U.S. Cl. .......................................... 83/13; 83/830; 30/383
[58] Field of Search ................ 83/788, 830, 831, 832, 83/833, 834, 13; 30/381, 383

[56] References Cited

U.S. PATENT DOCUMENTS

| | | | |
|---|---|---|---|
| 1,150,217 | 8/1915 | Martin | 83/833 |
| 2,488,886 | 11/1949 | Young | 56/291 |
| 3,006,126 | 10/1961 | Viverette | 56/13.3 |
| 3,618,649 | 11/1971 | Benno | 83/788 |
| 3,871,255 | 3/1975 | Nisula | 83/155 |
| 4,164,835 | 8/1979 | Conte | 56/291 |
| 4,903,562 | 2/1990 | Wunder et al. | 83/833 |

FOREIGN PATENT DOCUMENTS 2500357  8/1982  France ........................ 83/830

Primary Examiner—Eugenia Jones
Assistant Examiner—Raymond D. Woods
Attorney, Agent, or Firm—Adrian D. Battison; Stanley G. Ade; Murray E. Thrift

[57] ABSTRACT

An apparatus for cutting baled crop materials particularly of the cylindrical bale type comprises an apparatus in the form of a conventional chain saw in which the chain is modified so that either the slide links or the guide links include an outwardly projecting cutting plate. The cutting plate is shaped to form a cutting edge having a ramp shape commencing at a position intersecting the previous link and extending outwardly at a gradual inclination of the order of 20° to an outermost point and then a trailing edge which extends backwardly toward the main body of the chain. The width of the cutting plate is less than the width of the chain itself in view of the tension in the bale which pulls the bale apart as it is cut.

1 Claim, 5 Drawing Sheets

BALE CUTTING DEVICE

BACKGROUND OF THE INVENTION

This invention relates to a bale cutting device for cutting baled crop material of the type having elongate elements formed into the bale so the elongate elements lie generally parallel.

The baling of crop materials particularly hay or forage crops for consumption subsequently by animals has in recent years used almost exclusively the large round bale type system. In this system a cylindrical bale is formed which can be four to six feet in diameter and approximately the same in axial length. These bales are convenient for handling and the baling systems are relatively simple and straightforward.

Often for livestock kept outdoors the bale is simply deposited on the ground often surrounded by a bale feeder so that the animals can take directly from the baled material and themselves dismantle the bale.

In some case this technique is not suitable particularly when the animals are housed and restrained. In this situation it is often desirable for the bale to be broken up so that it can be fed in separate portions to different animals.

Rectangular bales are relatively easy to break up since they are formed with the elongate elements of the crop material parallel so that the bale can simply break at a transverse plane since all the elements lie parallel to that plane.

Cylindrical bales however are very difficult to break since the elongate elements are wrapped around the axis.

Various shredding machines have been developed in which the bale is introduced into a hopper or the like and then it is abraded by rotating flails which rip the bale into small parts and ejected through a suitable duct. However these machines are expensive and have other disadvantages.

A bale slicing machine is shown in U.S. Pat. No. 3,618,649 (Benno) which includes a hopper into which the material is dropped in the bale formed together with a pair of cutting chains which extend transversely to the bale and provide a cutting action. The details of the chains are not shown but the teeth of the chains appear to be of the type conventionally used on chain saws.

U.S. Pat. No. 3,871,255 (Nisula) discloses a device for cutting peat band rolls which apparently comprises an arrangement having an endless chain but again the details of the chain are not shown.

Other chain cutting devices are provided for example as shown in U.S. Pat. Nos. 2,488,886 (Young), 3,006,126 (viverette) and 4,164,835 (Conte) in ,which the chain carries outwardly projecting cutting blades which cooperate with stationary fingers in a sickle-knife cutting action. However none of these cutting device are suitable for cutting bales in view of the presence of the cutting fingers and in view of the fact that the cutting edges on the chain are designed in a manner which renders them suitable for cutting with the stationary fingers but completely unsuitable for cutting a bale.

SUMMARY OF THE INVENTION

It is one object of the present invention, therefore, to provide an apparatus and method for cutting baled crop materials of the type having longitudinal crop elements.

According to a first aspect of the invention there is provided an apparatus for cutting baled crop materials comprising a support housing, manual graspable handles on the support housing by which the housing can be lifted, a drive sprocket mounted on the housing for rotation about an axis transverse to the drive sprocket, a drive motor mounted in the housing for driving the sprocket, an elongate continuous cutting chain wrapped around the drive sprocket for generating movement of the chain in a direction along its length, a blade shaped support plate for the cutting chain mounted on the housing and extending outwardly therefrom, a guide track on an edge of the support plate for directing the chain around the support plate, the support plate being arranged such that the chain is exposed along at least part of its length in a cutting zone and in the cutting zone is free from cooperation with stationary cutting elements, the cutting chain comprising a plurality of interconnected links including cutting links and coupling links, the cutting links having a cutting edge thereon which is shaped such that it has a forward end intersecting a surface of a previous link in the chain and from the surface of the previous link is inclined rearwardly and outwardly from the support plate to a point of greatest distance from the support plate and having a trailing edge extending from the point of greatest distance inwardly toward the support plate, the cutting edge being shaped such that at all points along its length its inclination to the adjacent edge of the support plate is less than 45° and such that the cutting edge and the trailing edge are prevented from grasping elongate elements of the baled crop material.

According to a second aspect of the invention there is provided a method of cutting a bale of crop material having longitudinal elements of the crop material extending mutually parallel in the bale, the method comprising engaging the bale with a rotating continuous chain, the chain being rotated in a direction transverse to the longitudinal crop elements, the chain being exposed outwardly of a support plate and being free from cooperating stationary cutting elements, the chain including a plurality of cutting links each having a cutting edge which is shaped such that it has a forward end intersecting a surface of a previous link in the chain and from the surface of the previous link is inclined rearwardly and outwardly from the support plate to a point of greatest distance from the support plate and having a trailing edge extending from the point of greatest distance inwardly toward the support plate, the cutting edge being shaped so as to prevent grasping of any of the longitudinal crop elements while acting to cut the longitudinal crop elements, the cutting edge forming a single edge narrower than a transverse width of the chain, and causing the tension in the bale to spread cut ends of the longitudinal elements of the crop material to prevent engagement of the cut ends with sides of the chain.

One embodiment of the invention will now be described in conjunction with the accompanying drawings in which:

DESCRIPTION OF THE DRAWINGS:

In the drawings like characters of reference indicate corresponding parts in the different figures.

DETAILED DESCRIPTION

Figure 1:
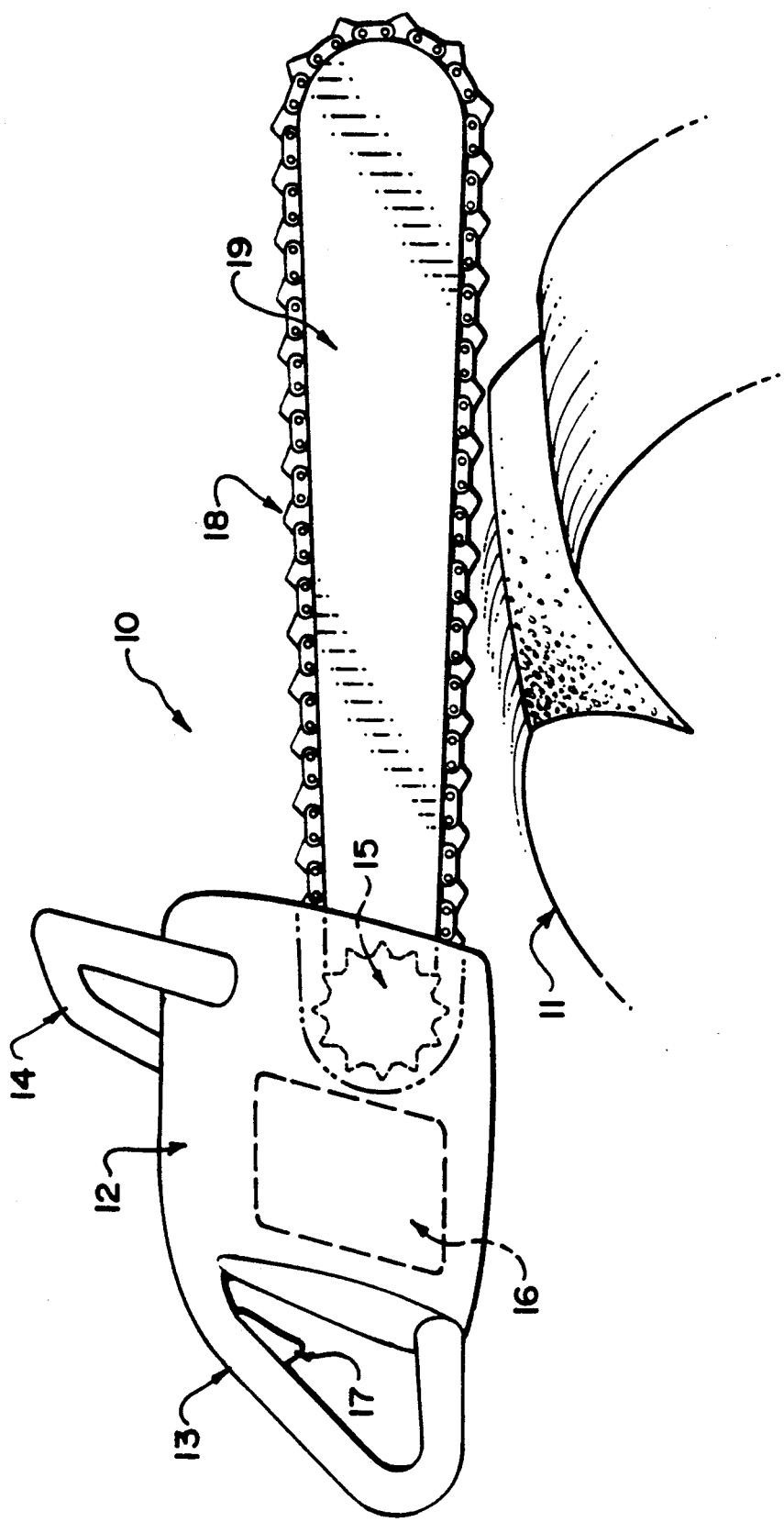
FIG. 1 is an isometric view of a cutting apparatus according to the present invention in operation.

The cutting apparatus is generally indicated in FIG. 1 at reference numeral 10 and is shown operating upon a bale shown schematically at 11.

The cutting apparatus is similar to a conventional chain saw in that it includes a housing 12 having a first handle 13 and a second handle 14 by which the housing can be grasped and manually moved from place to place in a cutting action. The housing includes a sprocket 15 which is mounted within the housing on a suitable transverse axle allowing the sprocket to rotate about its axis to drive the chain. The sprocket is driven by a motor schematically indicated at 16 which is operated by a trigger 17 carried on the handle 13. The operator can thus grasp the handle 13 with one hand, the handle 14 with the opposed hand and can operate the trigger 17 to rotate the sprocket thus driving the chain in a conventional action. The chain is shown schematically in FIG. 1 and comprises an endless chain 18 which is wrapped around a support plate 19 carried on the housing and projecting outwardly therefrom so that the plate is normally vertical when the housing is suspended from the handle 14. The chain is wrapped around the plate in a guide track shown in more detail hereinafter.

Figure 2:
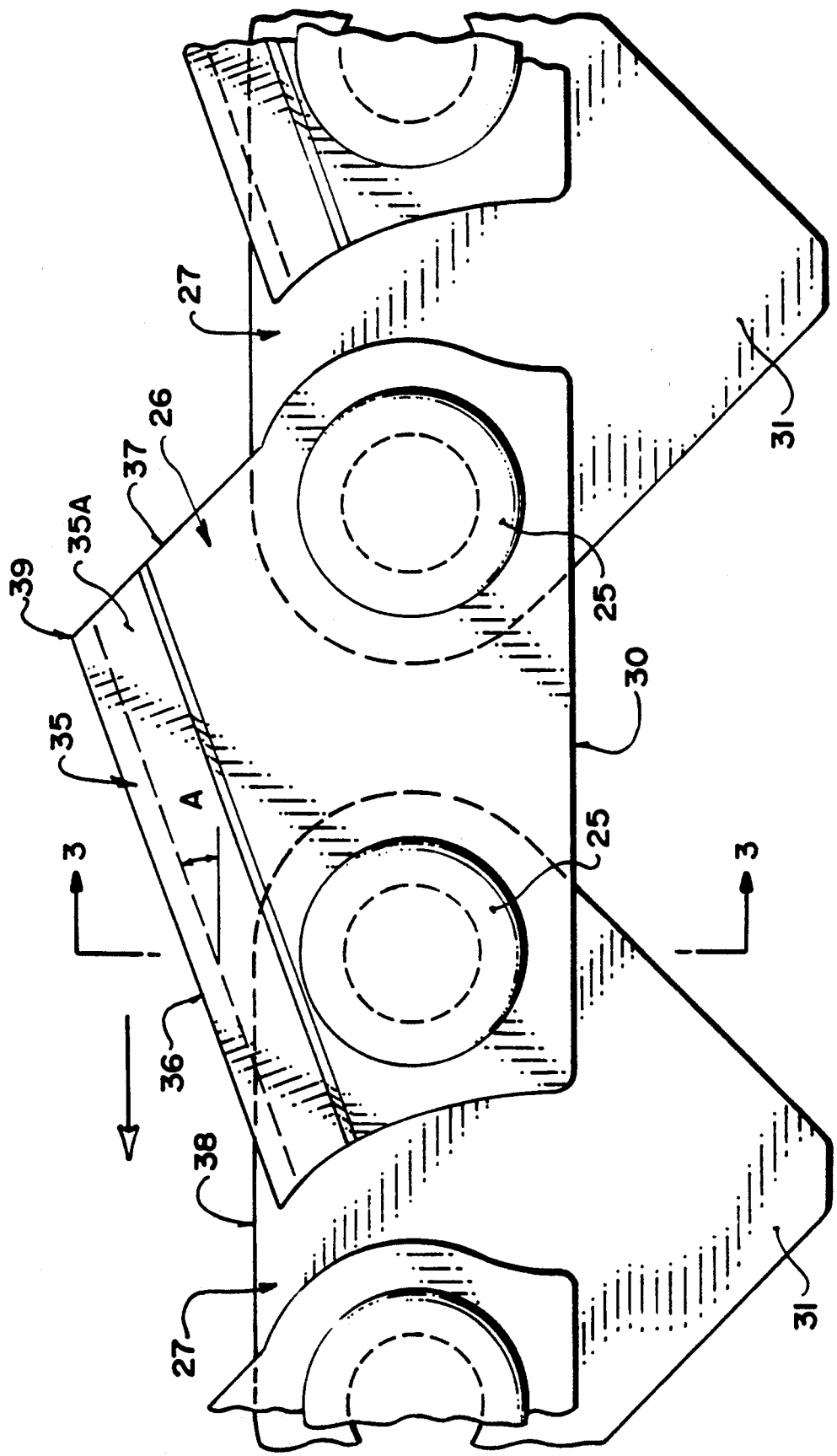
FIG. 2 is a side elevational view of one embodiment of the cutting chain used with the apparatus of FIG. 1.
Figure 3:
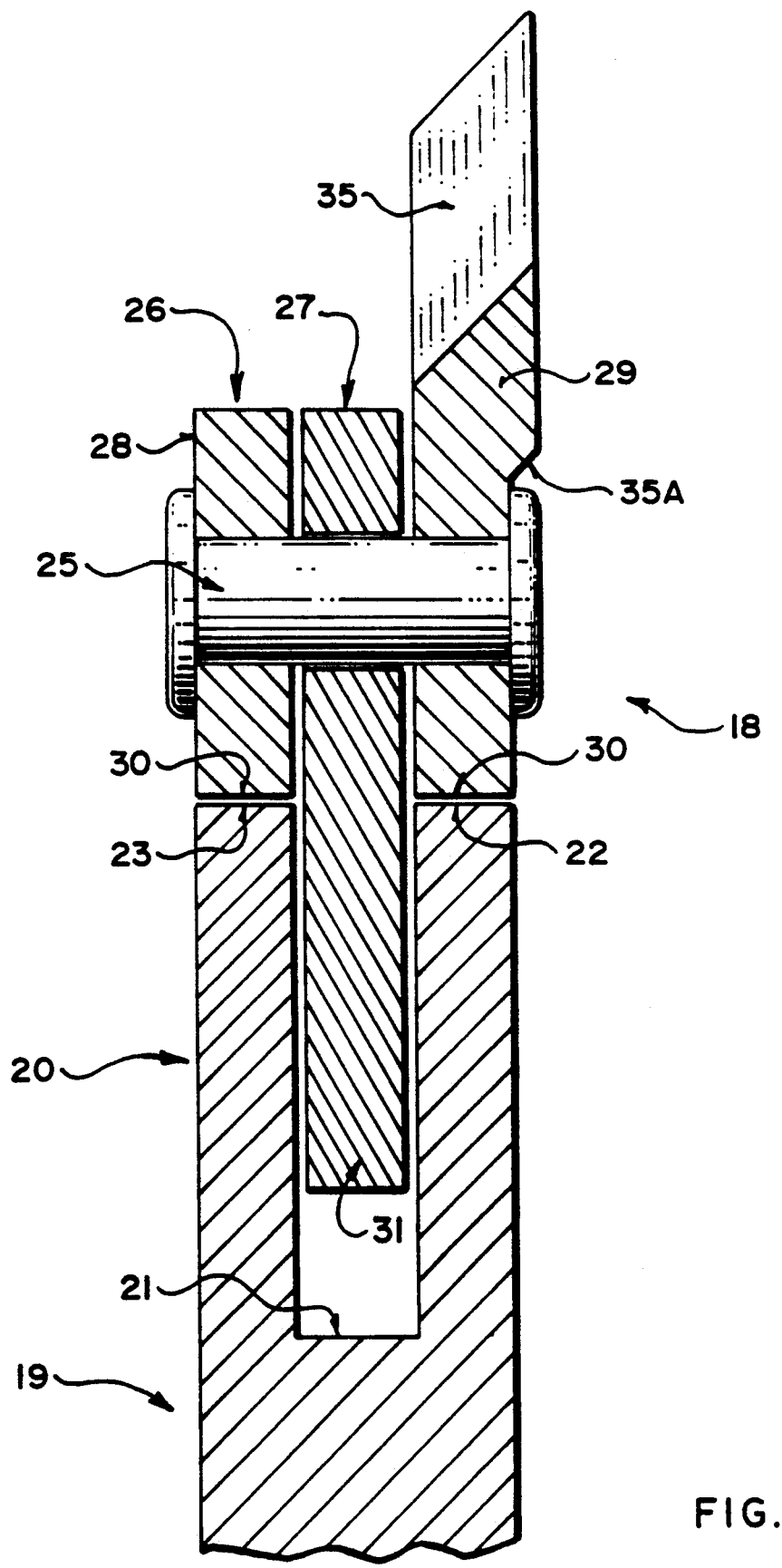
FIG. 3 is a cross sectional view along the lines 3—3 of FIG. 2.

Turning now to FIGS. 2 and 3, an edge of the plate 19 is shown in FIG. 3 wherein the guide track is indicated at 20. The guide track includes a recess 21 which is positioned between two outward raised edge surfaces 22 and 23 of the plate. The raised surfaces 22 and 23 act as sliding surfaces whereas the recess 21 therebetween acts as a guide. The chain comprises a plurality of link pins 25 which connect together alternately slide links 26 and guide links 27. The sliding links 26 comprise two parallel plates 28 and 29 mounted on the pins 25 and spaced by the guide link 27. The parallel plates 28 and 29 have a flat undersurface 30 which slides on a respective one of the sliding surfaces 22 and 23. The guide links 27 include a fin 31 which extends downwardly below the surfaces 30 into the recess 21 so as to guide the chain as it slides along the guide track to hold the bottom surfaces 30 in contact with the sliding surfaces 22 and 23.

One of the plates of the sliding links in this case the plate 29 is modified by the addition of a cutting plate 35 which projects outwardly from the outer edge of the plate 28 and the outer edge of the guide link 27. The cutting plate 35 includes a cutting edge 36 and a trailing edge 37. The cutting edge defines a ramp surface which extends from a point at or below the outermost surface 38 of the guide link 27 upwardly and outwardly away from the outer edge of the plate to a point 39 of maximum distance from the plate at which the cutting edge 36 intersects with the trailing edge 37 which is then inclined downwardly and rearwardly back toward the link 27. The angle of inclination indicated at A of the cutting edge relative to the side edge of the plate that is parallel to the edge 30 of the link is preferably of the order of 20° as illustrated but can lie between 10° and 45° and more preferably between 10° and 30°. This shallow angle of the cutting edge provides a ramp surface with no returns or notches or other elements which could abut or contact a portion of the crop material to be cut. The only object that the crop material can contact above the chain is the edge 36 which is a cutting edge so that there is necessarily a cutting action on all the crop material contacted without the possibility of it being grasped and pulled.

As shown in FIG. 3 the cutting plate 35 has a width narrower than the width of the chain as defined by the length of the pin 25. The cutting plate is formed so that it projects outwardly as indicated at 35A over the head of the pin 25 on the side of the cutting plate so as to yet further prevent material from being grasped by the head of the pin. The chain on that side of the cutting plate therefore provides a relatively smooth surface.

In the cutting action shown in FIG. 1, a cutting zone of the plate 19 is brought toward the bale that is at the underside of the plate at which time the chain and particularly the cutting plates 35 engage the bale in a cutting action. In this cutting zone the plate is entirely free from stationary fingers or other cutting edges which cooperate with the chain so that the only cutting action is provided by the chain.

During the cutting action the tension in the bale once the crop material is cut tends to pull the crop material apart. There is no necessity therefore for the chain to attempt in any way to cut a width in the crop material to allow it to pass through since the crop material automatically spreads and allows the remainder of the chain and the plate to pass through into the cut section.

Figure 4:
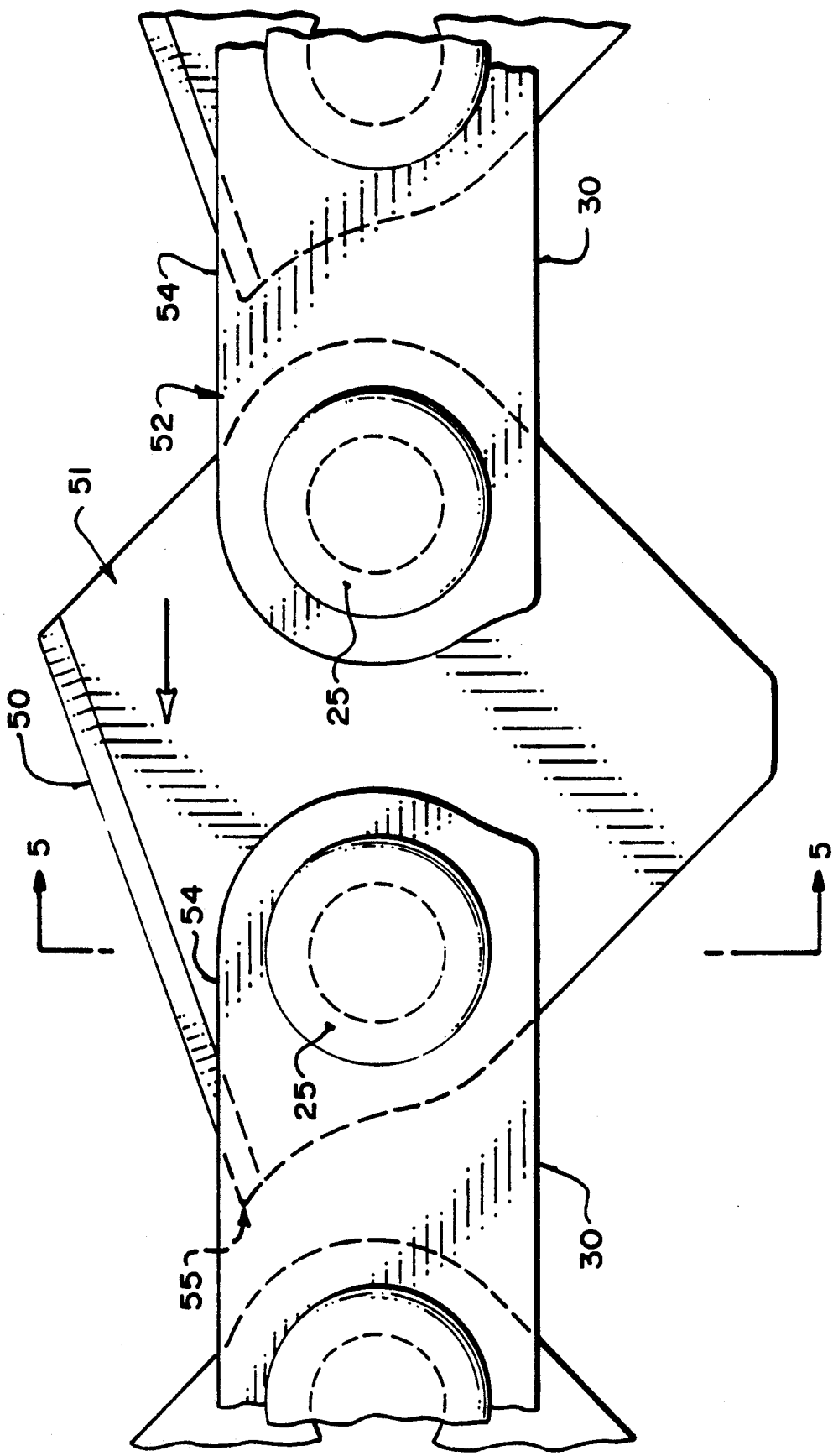
FIG. 4 is a side elevational view of a second embodiment of a chain for use with the apparatus of FIG. 1.
Figure 5:
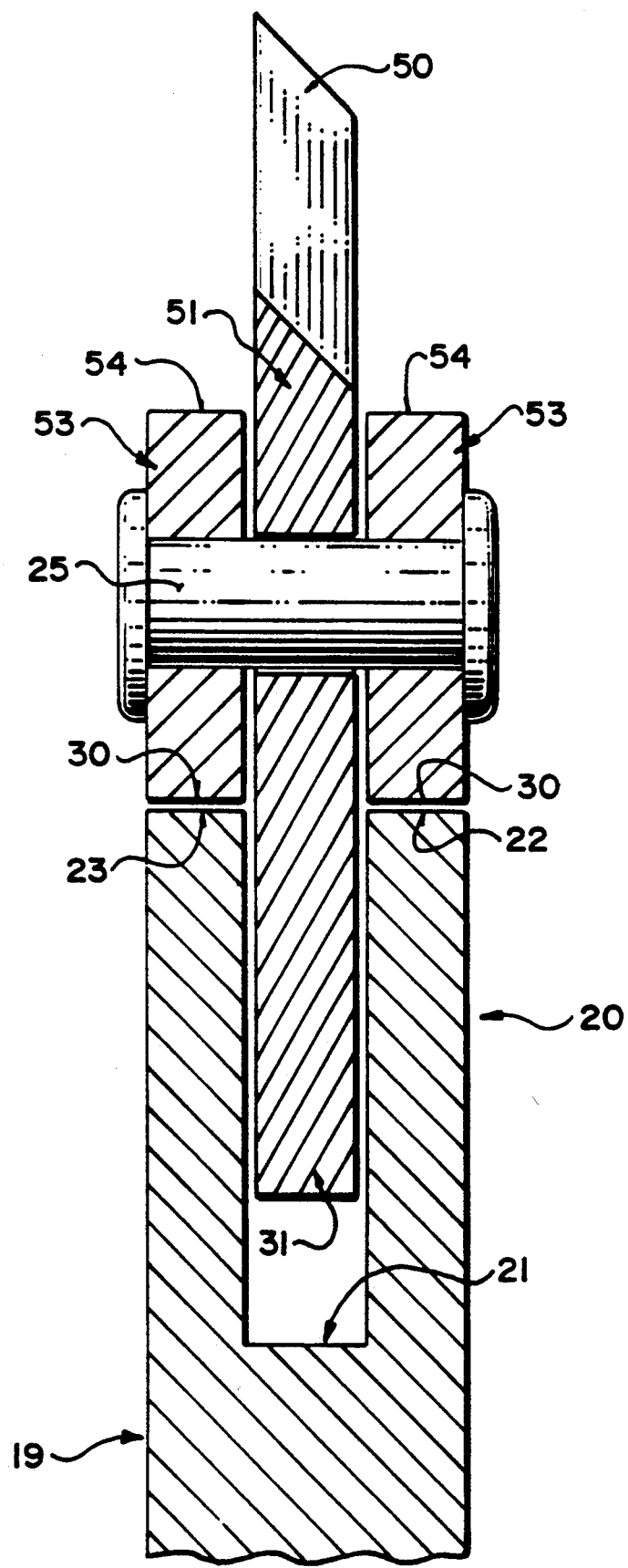
FIG. 5 is a cross sectional view along the lines 5—5 of FIG. 4.

Turning now to FIGS. 4 and 5, an alternative arrangement is shown in which the cutting edge is indicated at 50 and is provided on the guide link 51. Thus the chain is substantially as previously described mounted within the track including the slide edges 22 and 23 and the recess 21. In this case, however, the slide link 52 simply comprises a pair of parallel plates 53 spaced either side of the central guide link. The plates 53 thus have bottom surfaces 30 as previously described together with parallel upper surfaces 54 which take no part in the cutting action. In this arrangement the edge 50 is shaped similarly to the cutting edge 36 and operates in the same manner. The cutting edge commences at a position intersecting with the upper edge 54 so that there is no possibility of crop material becoming wedged underneath the cutting edge 50 and between the cutting edge 50 and the top edge 54. For this purpose the guide link is formed so that it extends forwardly to a point 55 forward of the normal extent of a link of this type to allow the edge 50 to intersect with the surface 54 and yet have the required shallow angle of the order of 20°.

In a situation where the baled crop material does not spring apart when cut to allow the chain and guide plate to pass through, the chain can be modified so that the sliding links, of the type shown in FIG. 3, have cutting plates on the left and righthand sides alternately. This cuts a channel in the material equal to the spacing across the chain with the width defined between the projecting portion 35A of one link and a similar projecting portion of the next alternate link.

In situations where the crop material does open up, the arrangement of FIG. 5 is preferred.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of cutting a bale of crop material having longitudinal elements of the crop material extending under tension substantially mutually parallel inn the bale, the method comprising engaging the bale with a rotating continuous chain, rotating the chain in a direction transverse to the longitudinal crop elements, defining on the chain a plane at right angles to the crop elements, exposing the chain outwardly of a support plate, rendering the chainfree from cooperating stationary cutting elements, defining on the chain a plurality of cutting links having crop engaging means mounted thereon and extending outwardly therefrom, forming the crop engaging means of each link so as to consist solely of a single planar cutting plate lying in the plane of the chain and so as to project outwardly from a respective one of the cutting links, shaping the plate so that it is narrower than a transverse width of the chain and so as to define a cutting edge which is shaped such that it has a forward end intersecting a surface of a previous link in the chain and from the surface of the previous link is inclined rearwardly and outwardly from the support plate to a point of greatest distance from the support plate and having a trailing edge extending from the point of greatest distance inwardly toward the support plate, preventing grasping of any of the longitudinal crop elements while cutting the longitudinal crop elements by shaping the cutting edge such that at all points along its length its inclination to an adjacent edge of the support plate is less than 30 degrees and by causing the cutting action of the cutting links to be effected solely by the cutting plates which slice the longitudinal elements of the crop material to form cut ends without removing any portions of the crop material, and causing the tension in the bale to spread cut ends of the longitudinal elements of the crop material to prevent engagement of the cut ends with sides of the chain.

* * * * *